(12) United States Patent
Budhia et al.

(10) Patent No.: US 9,043,450 B2
(45) Date of Patent: May 26, 2015

(54) GENERIC OFFLOAD ARCHITECTURE

(75) Inventors: Rupa Budhia, Bangalore (IN); Puneet Agarwal, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 45 days.

(21) Appl. No.: 12/580,094

(22) Filed: Oct. 15, 2009

(65) Prior Publication Data

US 2010/0094982 A1   Apr. 15, 2010

Related U.S. Application Data

(60) Provisional application No. 61/105,697, filed on Oct. 15, 2008.

(51) Int. Cl.
*G06F 15/177* (2006.01)
*G06F 9/50* (2006.01)
*H04L 29/08* (2006.01)

(52) U.S. Cl.
CPC .............. *G06F 9/5044* (2013.01); *H04L 69/32* (2013.01); *G06F 2209/509* (2013.01)

(58) Field of Classification Search
USPC .................. 709/221–225, 226, 230; 370/469
See application file for complete search history.

(56) References Cited

U.S. PATENT DOCUMENTS

| | | | |
|---|---|---|---|
| 2003/0133451 A1* | 7/2003 | Mahalingaiah | 370/389 |
| 2005/0238049 A1* | 10/2005 | Delregno | 370/466 |
| 2005/0278476 A1* | 12/2005 | Teske et al. | 711/100 |
| 2006/0104308 A1* | 5/2006 | Pinkerton et al. | 370/469 |
| 2006/0193318 A1* | 8/2006 | Narasimhan et al. | 370/389 |
| 2007/0255866 A1* | 11/2007 | Aloni et al. | 710/52 |
| 2008/0071947 A1* | 3/2008 | Fischer et al. | 710/48 |
| 2009/0006546 A1* | 1/2009 | Blumrich et al. | 709/204 |
| 2009/0106436 A1* | 4/2009 | Andersson et al. | 709/230 |

\* cited by examiner

*Primary Examiner* — Vivek Srivastava
*Assistant Examiner* — Normin Abedin
(74) *Attorney, Agent, or Firm* — McDermott Will & Emery LLP

(57) ABSTRACT

An system comprising an ingress device configured to receive and process data, wherein the ingress device comprises a plurality of processing stages configured to process the data, wherein a configurable subset of the stages comprises a selectable tap point, and wherein the ingress device is further configured to, upon reaching a selected tap point, suspend processing and send at least a portion of the data to another device; an offload engine device configured to receive data from the ingress device, after the selected tap point has been reached, and to provide additional processing of the data, which the ingress device is not configured to provide; an egress device configured to transmit the data that has been additionally processed by the offload engine device.

21 Claims, 6 Drawing Sheets

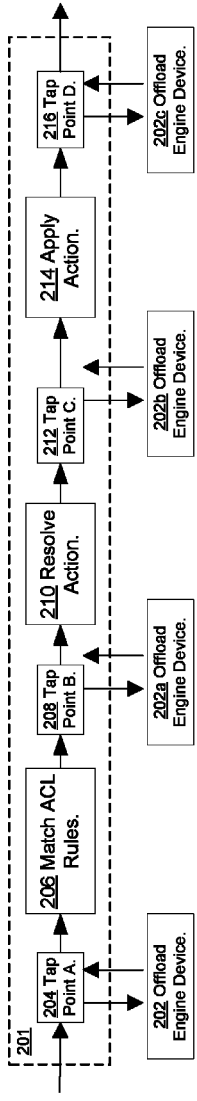
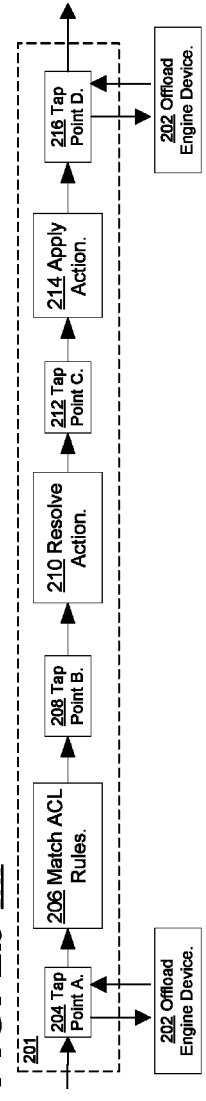
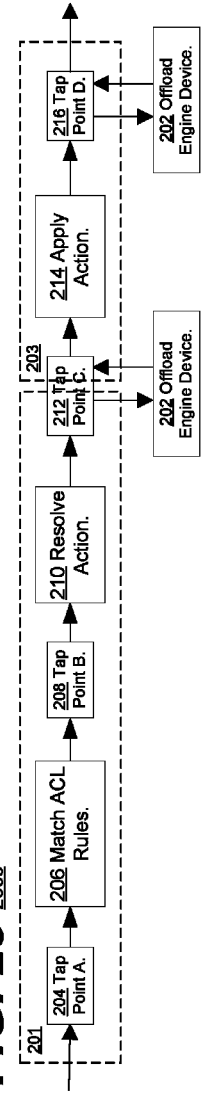

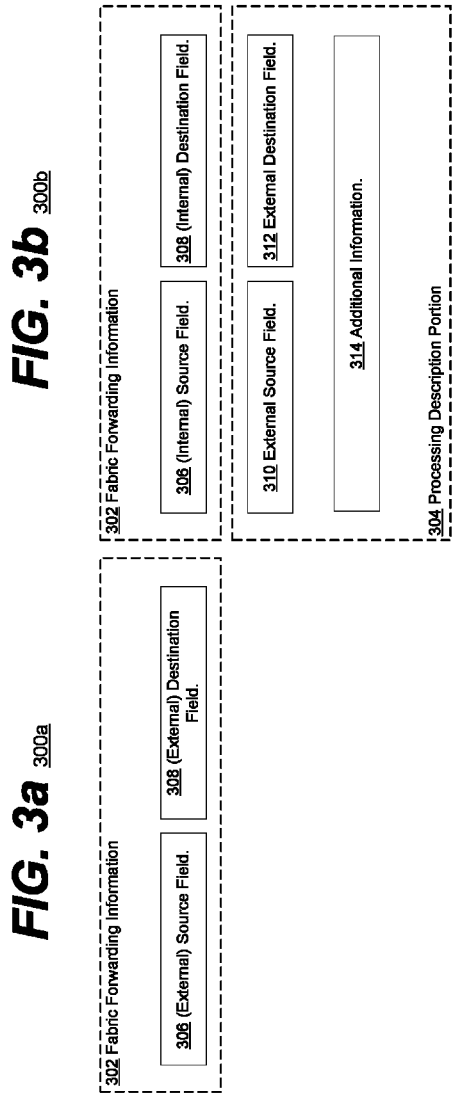

400

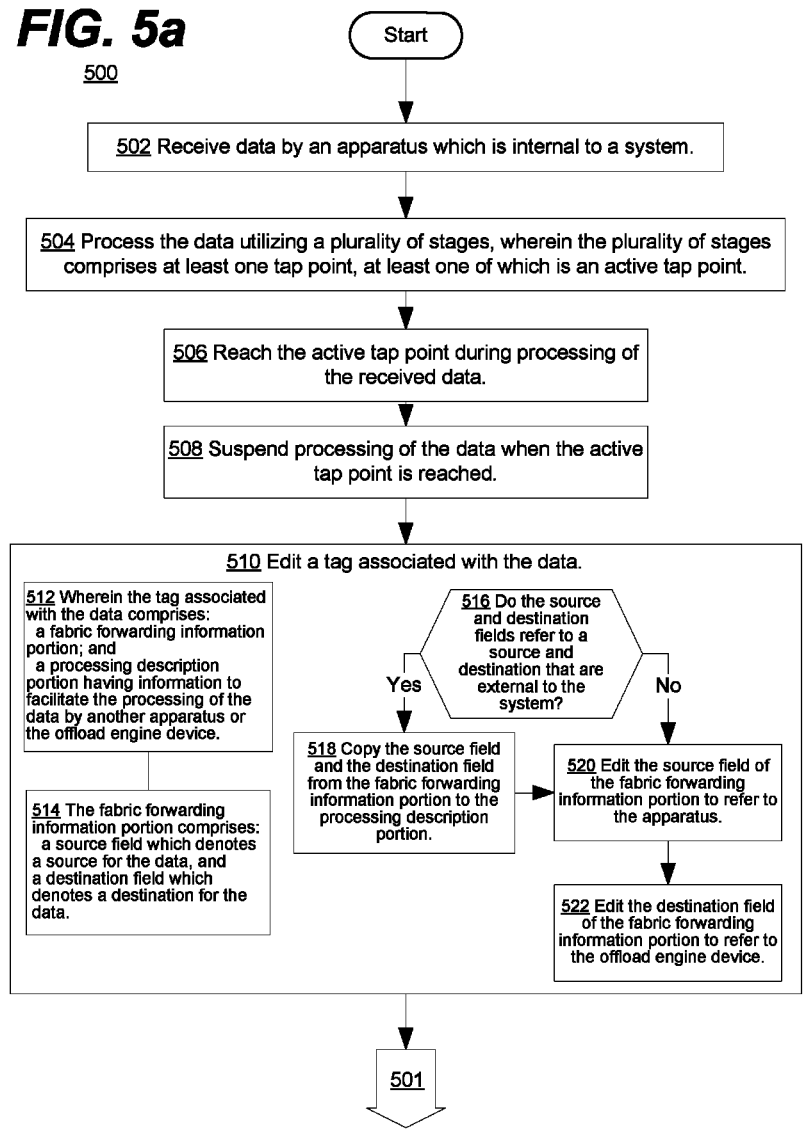

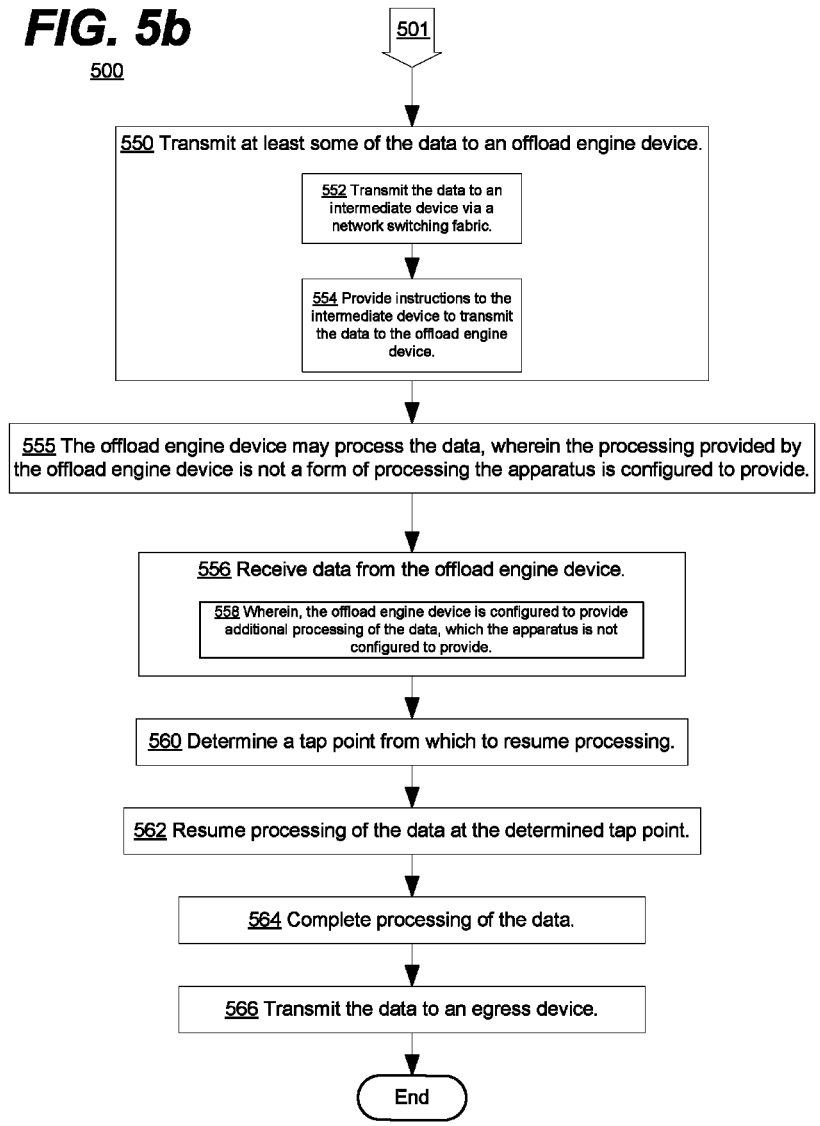

GENERIC OFFLOAD ARCHITECTURE

CROSS-REFERENCE TO RELATED APPLICATION

This application claims priority under 35 U.S.C. §119 to U.S. Provisional Patent Application 61/105,697, filed Oct. 15, 2008, titled "GENERIC OFFLOAD ARCHITECTURE," which is incorporated herein by reference in its entirety.

TECHNICAL FIELD

This description relates to the processing of data within a communications system, and more specifically to the processing of data using both an ingress device and a generic offload engine within a communication system.

BACKGROUND

In this context, a network switch (or just "switch") may include a device that channels incoming data flow from any of multiple input ports to the output port appropriate for the data flow's destination. Typically network switches play an important or integral role in many networks. Typically, network switches may be capable of inspecting data as it is received, determining the source and destination device of that data, and forwarding it appropriately. Frequently, by delivering each piece of data only to the device it was intended for, a network switch may conserve network bandwidth and offer generally improved performance compared to a network hub (or just "hub").

Typically many local-area networks (LANs) and wide-area networks (WANs) may include a number of linked switches. Whereas, often Small Office, Home Office (SOHO) applications typically make use of a single switch or an all-purpose converged device (e.g., a gateway or a router). Typically, switches utilize a networking protocol known as Ethernet, but it is understood that neither the disclosed subject matter nor switches in general are limited to a single networking protocol.

In some instances, a network switch may be incorporated into a single integrated circuit (IC). In this context, such a device may be referred to as a switch-on-a-chip (SOC). Occasionally, a plurality of SOCs may be used together to form a larger switching system. In many instances such a switching system may be packaged, sold, and thought of as a single switch. Often, such a switch may allow for the insertion of additional SOCs (e.g., using plug-in cards) to increase the capacity of the packaged switch.

SUMMARY

A system and/or method for communicating information, substantially as shown in and/or described in connection with at least one of the figures, as set forth more completely in the claims and the specification herein, is disclosed.

BRIEF DESCRIPTION OF THE DRAWINGS

FIGS. 2a, 2b, and 2c are block diagrams of example embodiments of systems for the processing of data within a communication system in accordance with the disclosed subject matter.

FIGS. 3a and 3b are block diagrams of example embodiments of data structures for the processing of data within a communication system in accordance with the disclosed subject matter.

FIG. 5 is flowchart of an example embodiment of a technique for the processing of data within a communication system in accordance with the disclosed subject matter.

DETAILED DESCRIPTION

As stated above, in some instances, a network switch may be incorporated into a single integrated circuit (IC). In this context, such a device may be referred to as a switch-on-a-chip (SOC). In many instances, various embodiments of switches-on-a-chip are fixed processing devices. In one embodiment, the SOC may be manufactured in such a way that the primary features of the switch are fixed at the time of manufacture; however, it is understood that, in one embodiment, various settings or control instructions may alter how the switch performs the fixed features. As such, in one embodiment, when a new feature is desired, it may take time to design and manufacture a chip that supports this feature. In the interim or as an alternative, there may be value in being able to support the new feature through an offload engine device that, in one embodiment, plugs into the system. Also, in one embodiment, it may be desirable to apply certain features to only a sub-set of ports.

Figure 1A:
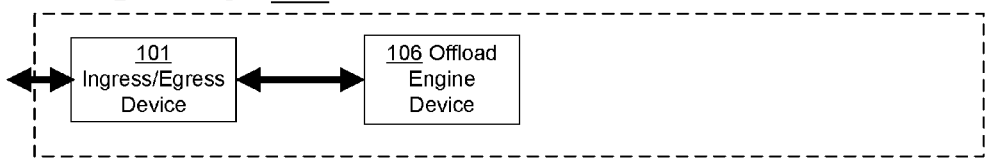
FIGS. 1a, 1b, 1c, and 1d are block diagrams of example embodiments of systems for the processing of data within a communication system in accordance with the disclosed subject matter.

FIG. 1a is block diagrams of an example embodiment of a system 100a for the processing of data within a communication system in accordance with the disclosed subject matter. In one embodiment, the system 100a may include an ingress/egress device 101 and an offload engine device 106.

It is understood that while FIG. 1 and other figures throughout this document may only illustrate a single offload engine device (e.g., offload engine device 106) that these are merely illustrative embodiments of the disclosed subject matter, and that the disclosed subject matter is not limited to only one offload engine device and that embodiments with multiple offload engine devices are envisioned. Further, in various embodiments, these multiple offload engine devices may perform separate specialized tasks, whereas others may perform tasks duplicated by one of more of the embodiment's plurality of offload engine devices. It is understood that the above are merely a few illustrative examples to which the disclosed subject matter is not limited.

In one embodiment, the ingress/egress device 101 may be configured to both receive and transmit data. In one embodiment, the ingress/egress device 101 may include a plurality of processing stages configured to process the data. In one embodiment, a configurable subset of the stages comprises a selectable tap point. In one embodiment, the ingress/egress device 101 may be further configured to, upon reaching a selected tap point, suspend processing and send the data to another device. The processing stages and the related tap points are discussed in more detail below, in relation to FIGS. 2a, 2b, and 2c.

In one embodiment, the offload engine device 106 may be configured to receive data from a device, such as the ingress/egress device 101. In one embodiment, the offload engine device 106 may receive this data after the selected tap point has been reached. In one embodiment, the offload engine device 106 may provide additional processing of the data, which the transmitting device (e.g., ingress/egress device 101) is not configured to provide.

In one embodiment, the offload engine device 106 may return the additionally-processed data to the ingress/egress device 101, and the ingress/egress device 101 may be configured to transmit the data that has been additionally processed by the offload engine device. In one embodiment, the ingress/egress device 101 may include a switch-on-a-chip (SOC).

In one example embodiment, the ingress/egress device 101 may receive data and begin processing the data. In one embodiment, the ingress/egress device 101 may be configured to process the data using a plurality of stages. In one embodiment, a "stage" in this context may include a group of components that form part of an electrical system (e.g., a stage in a pipelined architecture). In various embodiments, a stage or "pipeline stage" may be responsible for modifying a group of signals or data as part of an overall processing of data. A stage may be analogous to a step or portion of an assembly line, in which each stage performs a definable portion or sub-set of an overall process. In one embodiment, the device may perform the stages in an overlapping fashion (once again, analogous to an assembly line) such that multiple sets of data are being processed simultaneously.

In one embodiment, the ingress/egress device 101 may select a subset of stages to use when processing the data. For example, an ingress/egress device 101 may be capable of performing many operations on the data; however, the ingress/egress device 101 may only perform a subset of operations on the data based, for example, upon the type of data of the settings of the ingress/egress device 101. To continue the assembly line analogy, an assembly line designed to build cars may perform different operations based upon the type of car being built. A more expensive car may undergo stages in the assembly line that a less expensive car may not, example stages may include a stage to add high-end electronic features (e.g., a navigation system, video players, etc.) to the car or put in leather upholstery. Likewise, in one embodiment, depending upon the type of data or other characteristics an ingress/egress device 101 may be configured to subject the data to different stages, as described below.

Colloquial usage may occasionally refer to a "stage being performed". It is understood by this that the signals (data or control signals) are input into the components compromising the stage. These signals are then modified or used to generate new signals by the components comprising the stage. These new or modified signals are then output from the components. It is understood that in this context if the colloquial phrase "a stage is performed" or an equivalent is encountered the more formal and proper phrase "the stage is configured to perform" is meant.

In one specific embodiment, the processing may include checking a set or series of rules (e.g., an Access Control List (ACL)) to determine what further processing to perform on the data. In one embodiment, the ingress/egress device 101 may complete a few stages of processing of the data. At a certain point, the ingress/egress device 101 may reach a tap point. In one embodiment, such a tap point may be a point at which the data may be sent to an offload engine device 106 for further, often special, processing.

In one embodiment, these tap points may be configurable in that they may or may not occur at the end/beginning of every stage. In one embodiment, the effective existence of a tap point may be configured as part of the settings associated with the ingress/egress device 101. For example, the tap points may be configured based upon what (if any) offload engine devices are included in the system.

Furthermore, the tap points may be selectable, in that the tap points may effectively be turned on or off based upon a set or series of rules. For example, in one embodiment, a certain tap point may be turned on or turned off depending upon the type or characteristics of the data. For example, voice data may be processed for quality of service (QoS) concerns, and stages and tap points based upon QoS may be selected; whereas video data or data marked as secret may be processed for digital rights management (DRM) or encryption, and stages and tap points based upon DRM may be selected. It is understood that the above are merely a few illustrative examples to which the disclosed subject matter is not limited.

In one embodiment, the offload engine device 106 may offer processing capabilities not available or provided by the ingress/egress device 101. For example, the offload engine device 106 may include processing stages to further process data according to QoS or DRM constraints. It is understood that the above are merely a few illustrative examples to which the disclosed subject matter is not limited. In one embodiment, the offload engine device 106 may include a plurality of processing capabilities. In one embodiment, the data or a tag associated with the data may indicate which of this plurality of processing capabilities are to be performed upon the data.

In one embodiment, once the offload engine device 106 has completed the desired processing, the data may be returned to the ingress/egress device 101. In one embodiment, the data may then be transmitted from the system. In one embodiment, the ingress/egress device 101 may be configured to resume the suspended process from the suspended point in the process. In one embodiment, the data may include or be associated with a tag that indicates the tap point at which processing was suspended. In one embodiment, the ingress/egress device 101 may continue normal processing from this tap point. In such an embodiment, upon completion of normal processing the ingress/egress device 101 may transmit the data either from the system or to another device.

Figure 1B:
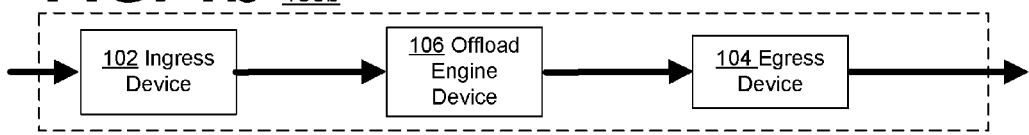

FIG. 1b is block diagrams of an example embodiment of a system 100b for the processing of data within a communication system in accordance with the disclosed subject matter. In one embodiment, the system 100b may include an ingress device 102, an offload engine device 106, and an egress device 104. In one embodiment, the system 100b may function similarly to the system 100a, with the exception that functions of the ingress/egress device 101 may be performed by the split devices, ingress device 102 and egress device 104. System 100a illustrates that, in one embodiment, the ingress and egress devices of the system may be the same device. Whereas, system 100b illustrates that the ingress and egress devices may be two separate devices. In one embodiment, the ingress device 102 may be substantially identical to the egress device 104. In one embodiment, the ingress device 102 and the egress device 104 may include a switch-on-a-chip (SOC).

In one embodiment, the offload engine device 106 may be configured to send the data to the egress device after the additional processing has been completed. In one embodiment, the egress device 104 may be configured to resume the process suspended by the ingress device 102 from the suspended point in the process.

Figure 1C:
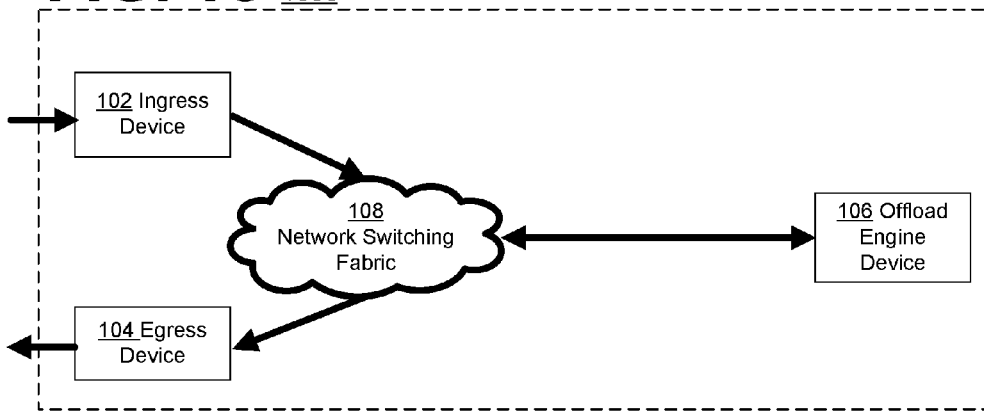

FIG. 1c is block diagrams of an example embodiment of a system 100c for the processing of data within a communication system in accordance with the disclosed subject matter. In one embodiment, the system 100c may include an ingress device 102, an offload engine device 106, network switching fabric 108, and an egress device 104.

In one embodiment, the network switching fabric 108 may be configured to provide interconnects to a plurality of system devices, comprising the ingress device 102, the egress device 104, and the offload engine device 106. In one embodiment, the network switching fabric 108 may include hardware, software, firmware, or a combination thereof, that moves data from one device to another within a system (e.g., system 100c). In one embodiment, the network switching fabric 108 may be independent of the bus technology or infrastructure used to move data between devices.

In one embodiment, the ingress device 102 may be configured to send data to the offload engine device 106 via the network switching fabric 108. Likewise, in one embodiment, the offload engine device 106 may be configured to send data to the egress device 104 via the network switching fabric 108.

In one embodiment, the ingress device 102 may be configured to associate a tag with the data, where the tag includes an external destination field, an external source field, an internal destination field, and an internal source field. In one embodiment, the other devices of the system (e.g., the offload engine device 106, and the egress device 104) may be configured to read and/or edit the tag. In one embodiment, the network switching fabric 108 may be configured to use the internal destination field and the internal source field to route the data between devices within or part of the system. In one embodiment, the ingress device 102 and the egress device 104 may be configured to use the external destination and external source fields to route the data to points outside the system.

Figure 1D:
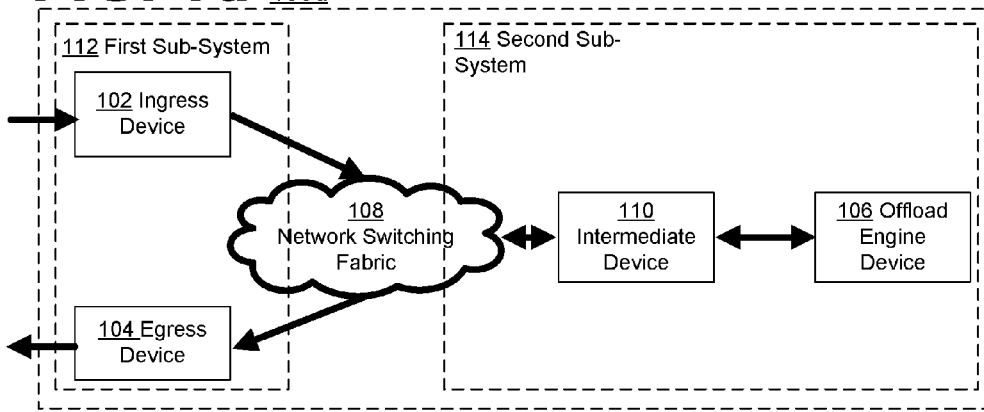

FIG. 1d is block diagrams of an example embodiment of a system 100d for the processing of data within a communication system in accordance with the disclosed subject matter. In one embodiment, the system 100d may include an ingress device 102, an offload engine device 106, network switching fabric 108, an intermediate device 110, and an egress device 104.

In one embodiment, the ingress device 102 may be configured to send data to the offload engine device 106 via the intermediate device 110. In one embodiment, the network switching fabric 108 may be used as an interconnect between the ingress device 102 and the intermediate device 110. In one embodiment, the ingress device 102 may edit the tag such that the ingress device 102 is identified in the internal source field and the intermediate device 110 is identified in the internal destination field. In one embodiment, the offload engine device 108 may be identified in the internal destination field. In one embodiment, similar edits may be performed the tag as the data is transferred from device to device within the system 100d.

In one embodiment, the intermediate device 110 may be substantially identical to the ingress device 102 and/or the egress device 104. In one embodiment, the intermediate device 110 may be coupled with the offload engine device 106. In one embodiment, the intermediate device 110 may be configured to process the data both from a suspended point and until a selected tap point, as described above.

In one embodiment, the system 100d may include a first sub-system 112 and a second sub-system 114. In one embodiment, the first sub-system 112 may include the ingress device 102 and the egress device 104. In one embodiment, the second subsystem 114 may include the intermediate device 110 and the offload engine device 108. In one embodiment, the system 100d may include a third sub-system (not shown) that includes the egress device 104 and in which the first sub-system 112 merely includes the ingress device 102. In one embodiment, a sub-system may be or include a plug-in card. In one embodiment, the network switching fabric 108 may include a back-plane.

In one illustrative embodiment, the system 100d may include a central back-plane and a plurality of plug-in cards (or, more generally, sub-systems). In such an embodiment, data may enter the system 100d at ingress device 102 on the first sub-system 112 or plug-in card. Data may, in one embodiment, travel across the back-plane or network switching fabric 108 to a second sub-system 114 or plug-in card that includes the offload engine device 106. In one embodiment, the interface to the second sub-system 114, and therefore the offload engine device 106, may be the intermediate device 110. In one embodiment, the offload engine device 106 may then send the data to an egress device 104, using the network switching fabric 108. In one embodiment, the egress device 104 may be a part of, for example, the first plug-in card (or more generally sub-system), the second plug-in card or a third plug-in card, etc. It is understood that the above are merely a few illustrative examples to which the disclosed subject matter is not limited.

FIG. 2a is a block diagram of an example embodiment of a system for the processing of data within a communication system in accordance with the disclosed subject matter. In one embodiment, the system 200a may include an apparatus or device 201 and a plurality of offload engine devices 202, 202a, 202b, and 202c. In one embodiment, the apparatus or device 201 may include a plurality of processing stages (e.g., stages 206, 210, and 214) and a plurality of configurable and selectable tap points (e.g., tap points 204, 208, 212, and 216).

In one embodiment, the system 200a illustrates an example in which all tap points are configured to be operable and are all selected. It is understood, as described above, that in various embodiments not all tap points may be configured to be operable. For example, the system may not include an offload engine device capable of taking advantage of particular tap points. In such an embodiment, those tap points may not be configured to be operable. In one embodiment, the configuration of the tap points may be done by hardware, software, firmware of a combination thereof. In one embodiment, the configuration may be dynamically changeable. In one embodiment, the configuration of the tap points may be based, at least in part, upon the availability of devices with a system. Conversely, the selection of the tap points may be based, at least in part, upon a set of series of rules, in which upon certain conditions being met tap points are selected for the data. In one embodiment, the selection of the tap points may be dynamic and changeable during the processing of the data.

In one embodiment, data may enter the device 201 or the illustrated sub-set of processing stages. In one embodiment, tap point A 204 may be selected, at which point the device 201 may suspend processing of the data, and the data may then be transferred to the offload engine device 202 for further processing. In one embodiment, upon completion of the processing by the offload engine device 202 the data may be returned to the device 201.

In one embodiment, the device 201 may resume processing the data from the suspended processing point, tap point A 204. In one embodiment, the device 201 may include a processing stage 206 that includes matching the data to various Access Control List (ACL) rules; however, it is understood that this is merely one example processing stage to which the disclosed subject matter is not limited. At the end of this processing stage, the tap point B 208 may have been selected, and again the data may be transferred to the offload engine device 202s. In some embodiments, a tag or metadata may be associated with the data or packet. This tag or metadata may include data associate with the tap points (e.g., tap oints 204, 208, etc.).

In one embodiment, the data may be returned and processed using the stage 210. In one embodiment, the device 201 may include a stage that resolves any actions dictated by the ACL rules; however, it is understood that this is merely one example processing stage to which the disclosed subject matter is not limited. At the end of this processing stage, the tap point C 212 may have been selected, and again the data may be transferred to the offload engine device 202b.

In one embodiment, the data may be returned and processed using the stage 214. In one embodiment, the device 201 may include a stage that applies any actions dictated by the ACL rules; however, it is understood that this is merely one example processing stage to which the disclosed subject matter is not limited. At the end of this processing stage, the tap point D 216 may have been selected, and again the data may be transferred to the offload engine device 202c. In one embodiment, upon the return of the data the data may be transmitted from the device 201, or in other embodiments, processing may continue within the device 201 using stages not illustrated by FIG. 2a.

In one embodiment, various processing stages of device (e.g., device 201) may perform various data processing actions or activities. In one embodiment, a processing activity that may involve a plurality of processing sub-stages. To continue the above car assembly line analogy an activity may include a large sub-portion of the overall action of building the car (e.g., assembling the interior of the car) that may include separate definable sub-portions or stages (e.g., upholstering the seats, bolting the seats into the car, etc.). In various embodiments, the processing activities may include: Packet Forwarding, Policing, Access Control Lists, Virtual Local Area Network (VLAN) Tag Actions, Quality of Service (QoS) Marking, Ingress Mirroring, Copying the data to a Central Processing Unit (CPU), Internet Protocol Flow Information Export (IPFIX) and updating various Counters; however, it is understood that the above are merely a few illustrative examples to which the disclosed subject matter is not limited.

In one embodiment, various processing activities, action, or portions thereof may be performed by an offload engine device (e.g., offload engine device 202). It is also understood that, in some embodiments, a plurality of offload engine devices may each provide one processing activity, and that, in yet another embodiment, the plurality of offload engine devices may each offer different processing activities.

As a non-limiting example, in one embodiment, the activity of Packet Forwarding may include stages entitled Incoming Layer-3 Determination, Forwarding Decisions, and Tunnel Decapsulation. In such an embodiment, the data may be formatting into a packet that may be forwarded from a first device to a second device. As such, the Incoming Layer-3 Determination stage may determine which network layer is used or desired by the data. In this context, the network layer is the third layer (Layer-3, of seven layers) in the Open Systems Interconnection (OSI) Basic Reference Model of networking abstraction model. The network layer, generally, includes a system for performing the routing of data between a source and destination. The Forwarding Decisions stage may include deciding how (e.g., which protocol, port, etc.) to forward the data. The Tunnel Decapsulation stage may include decrypting the data or (temporarily or permanently) removing header information from the data in order to perform additional processing (often as part of a subsequent activity in the processing pipeline).

In one embodiment, the Tunnel Decapsulation stage may be performed by an offload engine device 202. In one embodiment, the device 201 may include a Tunnel Decapsulation stage. However, in between the time when the device 201 was manufactured or designed a new tunneling scheme may have been developed or become popular; although, it is understood that the above motivations are merely a few illustrative examples to which the disclosed subject matter is not limited. In such an instance, an Offload Engine Device 202 may be added to the system 200a that is configured to perform the new form of Tunnel Decapsulation. In such an embodiment, when data using the new tunneling scheme is detected a tap point may be selected (e.g., Tap Point C 212 if in this example stage 214 is the integrated Tunnel Decapsulation stage). The data may then be transferred to the offload engine device 202. The offload engine device 202 may subject the data to the newer Tunnel Decapsulation stage and return the processed data to the device 201 at Tap Point D 216; therefore, bypassing the integrated Tunnel Decapsulation stage 214 of device 201. The device 201 may then, in one embodiment, continue to further process the data.

The following paragraph expands upon the illustrative example actions or activities described above. It is understood that one skilled in the art is expected to understand the examples or be capable of understanding the examples without undo research. In one embodiment, the action or activity of Policing may involve filtering or otherwise restricting data transmission based upon a set of criteria and may include stages entitled Policer Selection, Policer State Update, and Packet State Update. In one embodiment, the action or activity of Access Control Lists may involve filtering or otherwise routing of data based upon a set of rules (often in an If-Then rule format) and may include stages entitled Internet Filtering Protocol (IFP) Lookup and Apply IFP Actions. In one embodiment, the action or activity of Virtual Local Area Network (VLAN) Tag Actions may involve tagging data based upon the data's association with a VLAN and may include stages entitled VLAN Tag determination and Apply VLAN Tag Actions. In one embodiment, the action or activity of Quality of Service (QoS) Marking may involve marking data based in part upon the type of data or other characteristic in order to provide the data transmission with a certain quality of service and may include stages entitled QoS Marking and Packet Modifications. In one embodiment, the action or activity of Ingress Mirroring (or more generally Port Mirroring) may involve sending a copy of the network packets or data seen on one network or switch port to, in one embodiment, a network monitoring connection on another switch port and may include stages entitled Ingress Mirror Determination and Ingress Mirror packet copying. Likewise, in one embodiment, the action or activity of Copying the data to a Central Processing Unit (CPU) may involve sending a copy of various network packets or data a CPU (or more generally anther device) and may include stages entitled CPU Copying Determination, and CPU Copy packet copying. In one embodiment, the action or activity of Internet Protocol Flow Information Export (IPFIX) may involve a common standard to export Internet Protocol (IP) data from devices used in network management systems that, for example in one embodiment, track, measure, and eventually bill for network services and may include stages entitled IPFIX Flow Identification and IPFIX Flow State Update. In one embodiment, the action or activity of updating various Counters may involve tracking and measuring various things (what may be measured is essentially infinite and may vary based upon a given embodiment) and may include stages entitled Counter Selection and Counter Update. Additional activities may include, but are not limited to Intrusion Detection, Intrusion Prevention, Firewalling, Web-Caching, Voice-Over-Internet-Protocol (VoIP) call control, convergence applications, Network monitoring, billing and data capture, Wireless switching, Local web services, and Authentication servers. It is understood that the above are merely a few illustrative examples to which the disclosed subject matter is not limited. It is also understood that one skilled in the art is expected to understand the above examples or be capable of understanding the examples without undo research.

FIG. 2b is a block diagram of an example embodiment of a system for the processing of data within a communication system in accordance with the disclosed subject matter. In one embodiment, the system 200b may include a device 201 and an offload engine device 202. In one embodiment, the apparatus or device 201 may include a plurality of processing stages (e.g., stages 206, 210, and 214) and a plurality of configurable and selectable tap points (e.g., tap points 204, 206, 212, and 216).

However, unlike the system 200a, the system 200b may include only two selected tap points, tap point A 204 and tap point D 216. As such, data may be transferred only to the offload engine device 202 twice, as opposed to the four times of system 200a. Further, in this embodiment, processing may not be suspended or interrupted between the processing stage 202 and the processing stage 214.

It is understood that while only one offload engine device, device 202, has been illustrated in FIG. 2b that a plurality of offload engine devices may exist within a system. In one embodiment, any given tap point may transfer or send the data to different offload engine devices as warranted, for example based upon the processing needs, the capabilities of the particular offload engine device, the present workload of the system or offload engine device, etc.

FIG. 2c is a block diagram of an example embodiment of a system for the processing of data within a communication system in accordance with the disclosed subject matter. In one embodiment, the system 200c may include a device 201, an offload engine device 202, and a second device 203. In one embodiment, both device 201 and device 203 may include a plurality of processing stages (e.g., stages 206, 210, and 214) and a plurality of configurable and selectable tap points (e.g., tap points 204, 206, 212, and 216). In one embodiment, only device 201 may include stages 206 and 210 and tap points 204, 206, and 212. Whereas, in such an embodiment, device 203 may include stage 214 and tap points 212 and 216.

Unlike the system 200a, the system 200c may only include two selected tap points, tap point C 210 and tap point D 216. As such, data may only be transferred to the offload engine device 202 twice, as opposed to the four times of system 200a. Further, in this embodiment, processing may not be suspended or interrupted between the processing stage 202 and the processing stage 210.

In one embodiment, the offload engine device 202 may return the data, not to device 201, but to device 203. In one embodiment, the device 203 may determine the processing was suspended at tap point C 212 and resume processing from tap point C 212 of device 203. In various embodiments, the device 203 may determine that processing was suspended by information included within a header included by the data. In one embodiment, the device 203 may be an intermediate device (e.g., intermediate device 110 of FIG. 1d) or an egress device (e.g., egress device 104 of FIGS. 1b, 1c, or 1d).

FIGS. 3a and 3b are block diagrams of example embodiments of data structures for the processing of data within a communication system in accordance with the disclosed subject matter. As discussed above, a tag or data structure may be added to or associated with the data.

In one embodiment, the tag 300a may include a fabric forwarding information portion 302. In one embodiment, this fabric forwarding information portion 302 may include a source field 306 and a destination field 308. In one embodiment, as data enters a system it may already have a tag such as tag 300a associated with the data. In such an embodiment, the source filed 306 may indicate the source, external to the system, for the data. Whereas, the destination field 308 may indicate the destination, external to the system, for the data. In one embodiment, as the data moves throughout the system, these fields may simply be replaced with the source and destinations identifiers of devices internal to the system.

In one other embodiment, the tag 300a may be edited to reflect the data structure illustrated by tag 300b. In various embodiments, the Offload Device Engine 202 of FIG. 2 may edit the tag or tags as described. In one embodiment, the tag 300b may include a fabric forwarding information portion 302 and a processing description portion 304. In one embodiment, the processing description portion 304 may include the external source filed 310 and the external destination filed 312.

In one embodiment, as data is moved from the ingress device (e.g., ingress device 102 of FIG. 1) to another device within the system, the source field 306 may be copied or moved to an external source field 310 and, therefore, the information of the field may be preserved. Likewise, in one embodiment, the destination field 308 may be copied or moved to an external destination field 312 and, therefore, the information of the field may be preserved. In one embodiment, the source field 306 may be edited to show an internal source field 306 that indicates which device, internal to the system is the source of the data. Likewise, in one embodiment, the destination field 308 may be edited to show an internal destination field 308 that indicates which device, internal to the system is the destination of the data. In such an embodiment, the various devices of the system may simply read the fabric forwarding information portion 302 in order to route the data. If, in one embodiment, the destination field 308 indicates that the destination is internal to the system, the data remains within the system. In one embodiment, when the data finally reaches the egress device (e.g., egress device 104 of FIG. 1), internal information useful to the system may be removed from tag 300b and the tag may be restored to the state illustrated by tag 300a.

In one embodiment, the processing description portion 304 may also include additional information 314. In various embodiments, this information may include many different forms. In one embodiment, the processing description portion 304 may be limited to a set number of forms or formats. For example, in one embodiment, the offload engine device may need information generated or obtained as part of the processing provided by the ingress device. Such information may be placed in the additional information section 314 of the processing description portion 304. In one embodiment, information indicating the tap point at which processing was suspended may be included in the additional information section 314 of the processing description portion 304. In one embodiment, a tag may include a plurality of processing description portions, where each processing description portion utilizes a format indicating what type of information is included in the additional information portion 314.

Figure 4:
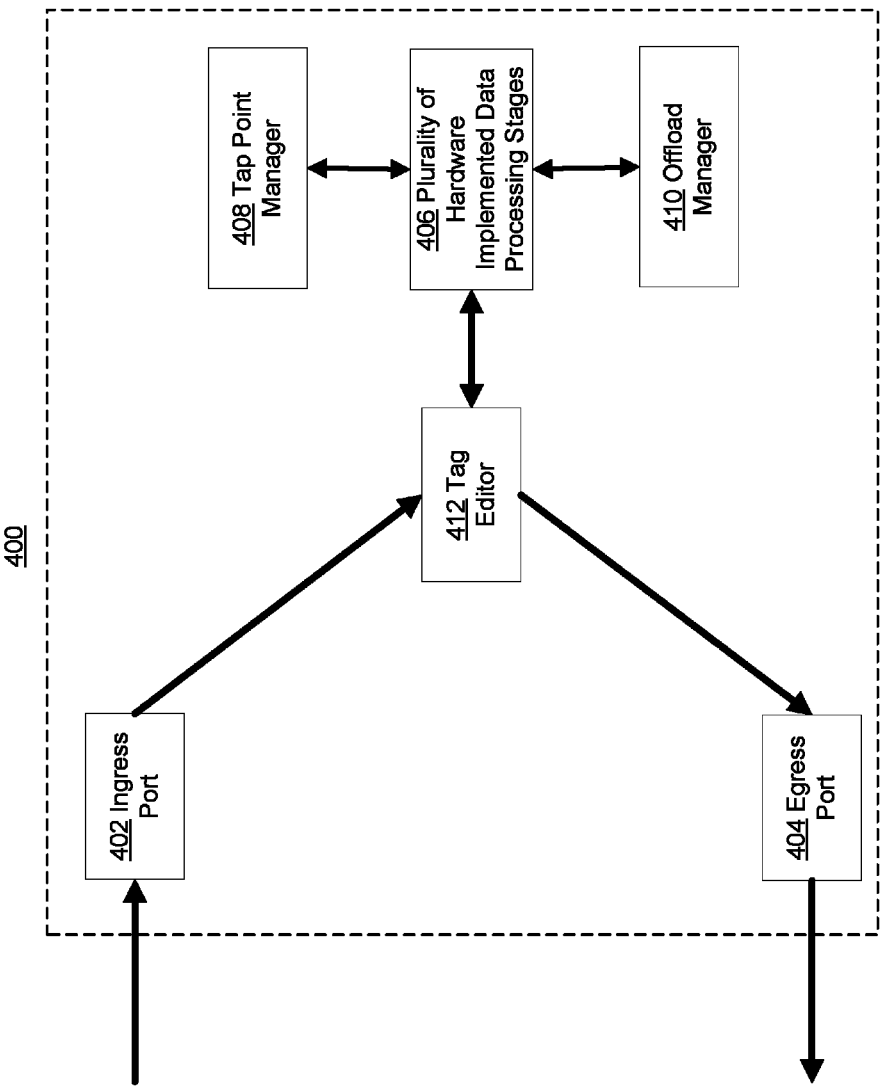
FIG. 4 is block diagram of an example embodiment of an apparatus for the processing of data within a communication system in accordance with the disclosed subject matter.

FIG. 4 is block diagram of an example embodiment of an apparatus 400 for the processing of data within a communication system in accordance with the disclosed subject matter. In one embodiment, the apparatus or device 400 may include an ingress port 402, an egress port 404 and a plurality of data processing stages 406. In one embodiment, the plurality of data processing stages 406 may include hardware implemented processing stages.

In one embodiment, the ingress device 402 may be configured to receive data, as described above. In one embodiment, the plurality of processing stages 406 configured to process the data, as described above. In one embodiment, a subset of the plurality of processing stages 406 may include a tap point, as described above. In one embodiment, the selection of the subset may be configurable. In one embodiment, a tap point may be configured to indicate a point in the process at which the device 400 may suspend processing and send the data to another device, as described above. In one embodiment, the egress port 404 may be configured to transmit the processed data. In one embodiment, the egress port 404 may be configured to transmit the data to either, as appropriate, a destination external to the system (e.g., system 100 et al. of FIG. 1) or another device (e.g., intermediate device 110 or offload engine device 106 of FIG. 1d).

In one embodiment, the device 400 may also include a tap point manager 408. In one embodiment, the tap point manager 408 may be configured to select a portion of the plurality of processing stages 406 to be part of the subset of the processing stages 406 that comprise a tap point. In one embodiment, the selection criteria may be based upon a set of rules, as described above.

In one embodiment, the device 400 may include a tag editor 412. In one embodiment, the tag editor 412 may be configured to associate a tag with the data. In one embodiment, the tag may include a processing description portion and a fabric forwarding information portion (e.g., tag 300b of FIG. 3b, as described above). In one embodiment, the tag may include an external destination field, an external source field, and internal destination field, and an internal source field (e.g., tag 300b of FIG. 3b, as described above). In one embodiment, the tag editor 412 may be configured to merely edit the tag, as described above. In one embodiment, the tag editor 412 may be configured to edit the tag associated with the data to denote that the apparatus 400 is the internal source, edit the tag associated with the data to denote that the offload engine device is the internal destination, and edit the tag to indicate which apparatus (e.g., apparatus 400) will perform the next processing step.

In one embodiment, the device 400 may include an offload manager 410. In one embodiment, the offload manager 410 may be configured to suspend the processing of data by the plurality of processing stages 406 when a selected tap point has been reached, as described above. In one embodiment, the offload manager 410 may be configured to transmit the data to an offload engine device configured to provide additional processing of the data, which the apparatus 400 is not configured to provide (e.g., offload engine device 106 of FIG. 1, as described above).

In one embodiment, the offload manager 410 may be configured to edit the tag associated with the data to denote that the apparatus 400 is the internal source, edit the tag associated with the data to denote that the offload engine device is the internal destination, and edit the tag to indicate whether or not the data may return to the apparatus 400. In one embodiment, some or all of these actions may be performed by the tag editor 412, as described above.

In one embodiment, the offload manager 410 may be configured to receive data from an offload engine device configured to provide additional processing of the data, which the apparatus 400 is not configured to provide (e.g., offload engine device 106 of FIG. 1, as described above). In one embodiment, the offload manager 410 may be configured to read a tag associated with the data that indicates the amount of processing that has been performed on the data, as described above. In one embodiment, the offload manager 410 may be configured to, based at least in part upon the amount of processing, determine an appropriate tap point at which to resume processing. In one embodiment, the offload manager 410 may be configured to resume the processing of data by the plurality of processing stages 406 at the determined appropriate tap point.

FIG. 5 is flowchart of an example embodiment of a technique 500 for the processing of data within a communication system in accordance with the disclosed subject matter. It is understood that FIGS. 5a and 5b represent a single flowchart illustrated on two pages. The connector 501 provides a way to represent the connection between the two pages. Hereafter and here-before, the flowchart of the technique 500 is simply referred to as FIG. 5, as if the flowchart merely occupied a single page.

Block 502 illustrates that, in one embodiment, data may be received by an apparatus which is internal to a system. In one embodiment, the data may be received from a source external the system. In one embodiment, the data may be received from a source internal the system. In one embodiment, the ingress device 102 of FIG. 1 may perform this receipt, as described above. In one embodiment, the ingress port 402 of FIG. 4 may perform this receipt, as described above.

Block 504 illustrates that, in one embodiment, data may be processed utilizing a plurality of stages, wherein the plurality of stages comprises at least one tap point, at least one of which is an active tap point. In one embodiment, the data may be received from a source external the system. In one embodiment, the data may be received from a source internal the system. In one embodiment, the ingress device 102 of FIG. 1 may perform this processing, as described above. In one embodiment, the plurality of processing stages 406 of FIG. 4 may perform this processing, as described above. In one embodiment, the tap points may be configured and selected, as described above.

Block 506 illustrates that, in one embodiment, an active or selected tap point may be reached during the processing of the plurality of processing stages. In one embodiment, the ingress device 102 of FIG. 1 may perform this processing to the selected tap point, as described above. In one embodiment, the plurality of processing stages 406 of FIG. 4 may perform this processing to the selected tap point, as described above.

Block 508 illustrates that, in one embodiment, processing may then be suspended. In one embodiment, the ingress device 102 of FIG. 1 may perform this suspension, as described above. In one embodiment, the plurality of processing stages 406 or the offload manager 410 of FIG. 4 may perform this suspension as described above.

Block 510 illustrates that, in one embodiment, a tag associated with the data may be edited or added. In one embodiment, the ingress device 102 of FIG. 1 may perform this editing, as described above. In one embodiment, the tag editor 412 or the offload manager 410 of FIG. 4 may perform this editing as described above.

Block 512 illustrates that, in one embodiment, the tag associated with the data may include a fabric forwarding information portion, and a processing description portion having information to facilitate the processing of the data by another apparatus or the offload engine device. In one embodiment, the tag 300b of FIG. 3b may include such portions, as described above. Block 512 also illustrates that, in one embodiment, the tag may be edited to include the above portions. In one embodiment, the ingress device 102 of FIG. 1 may perform this editing, as described above. In one embodiment, the tag editor 412 or the offload manager 410 of FIG. 4 may perform this editing as described above.

Block 514 illustrates that, in one embodiment, the fabric forwarding information portion of the tag may include a source field which denotes a source for the data, and a destination field which denotes a destination for the data. In one embodiment, the tags 300a and 300b of FIG. 3 may include such portions, as described above. Block 514 also illustrates that, in one embodiment, the tag may be edited to include the above fields. In one embodiment, the ingress device 102 of FIG. 1 may perform this editing, as described above. In one embodiment, the tag editor 412 or the offload manager 410 of FIG. 4 may perform this editing as described above.

Block 516 illustrates that, in one embodiment, a check may be made to determine whether or not the source and destination fields refer to devices external to the system, of which the apparatus is a part. In one embodiment, the ingress device 102 of FIG. 1 may perform this editing, as described above. In one embodiment, the tag editor 412 or the offload manager 410 of FIG. 4 may perform this determination as described above.

Block 518 illustrates that, in one embodiment, if the fields refer to external devices, the field values may be copied or moved from the fabric forwarding information portion to the processing description portion. In one embodiment, the ingress device 102 of FIG. 1 may perform this copying, as described above. In one embodiment, the tag editor 412 or the offload manager 410 of FIG. 4 may perform this copying as described above.

Block 520 illustrates that, in one embodiment, the source field of the fabric forwarding information portion may be edited to refer to the apparatus. In one embodiment, the ingress device 102 of FIG. 1 may perform this editing, as described above. In one embodiment, the tag editor 412 or the offload manager 410 of FIG. 4 may perform this editing as described above.

Block 522 illustrates that, in one embodiment, the destination field of the fabric forwarding information portion may be edited to refer to the offload engine device or other device within the system (e.g., the intermediate device 110 of FIG. 1d). In one embodiment, the ingress device 102 of FIG. 1 may perform this editing, as described above. In one embodiment, the tag editor 412 or the offload manager 410 of FIG. 4 may perform this editing as described above.

Block 550 illustrates that, in one embodiment, at least a portion of the data may be transmitted to an offload engine device. In one embodiment, the ingress device 102 or network switching fabric 108 of FIG. 1 may perform all or part of this transmission, as described above. In one embodiment, the egress port 404 of FIG. 4 may perform this transmission as described above.

Block 552 illustrates that, in one embodiment, at least a portion of the data may be transmitted to an intermediate device via a network switching fabric. In one embodiment, the ingress device 102 or network switching fabric 108 of FIG. 1 may perform all or part of this transmission, as described above. In one embodiment, the egress port 404 of FIG. 4 may perform this transmission as described above.

Block 554 illustrates that, in one embodiment, instructions may be provided to the intermediate device to forward the data to the offload engine device. In one embodiment, the intermediate device may perform additional processing of the data. In one embodiment, the ingress device 102 of FIG. 1 may provide the instructions, as described above. In one embodiment, the tag editor 412 or offload manager 410 of FIG. 4 may provide the instructions as described above. In one embodiment, the instructions may be part of the processing description portion 304 of the tag 300b, specify in one embodiment the additional information 314, of FIG. 3b, as described above.

Block 555 illustrates that, in one embodiment, an offload engine device may process the data, wherein the processing provided by the offload engine device is not a form of processing the apparatus is configured to provide. In one embodiment, the offload engine device 106 of FIG. 1 may provide this processing, as described above.

Block 556 illustrates that, in one embodiment, the data may be received from an offload engine device. In various embodiments, either the ingress device 102, the egress device 104, or the intermediate device 110 of FIG. 1 may receive the data, as described above. In one embodiment, the ingress port 402 of FIG. 4 may perform this receipt, as described above.

Block 558 illustrates that, in one embodiment, the processing provided by the offload engine device may not be a form of processing the apparatus is configured to provide. In one embodiment, the offload engine device 106 of FIG. 1 may provide this processing, as described above. In one embodiment, the offload engine device 106 of FIG. 1 may provide this processing, as described above.

Block 560 illustrates that, in one embodiment, the tap point from which the apparatus suspended processing may be determined. In one embodiment, the apparatus which performed Blocks 504, 506, and 508 may not be the same apparatus that performs Block 556 and 560 (e.g., systems 100b, 100c, and 100d of FIGS. 1b, 1c, and 1d). Block 560 also illustrates that, in one embodiment, the tap point from which to resume processing previously suspended may be determined. In various embodiments, either the ingress device 102, the egress device 104, or the intermediate device 110 of FIG. 1 may make this determination, as described above. In one embodiment, the offload manager 410 of FIG. 4 may make this determination, as described above.

Block 562 illustrates that, in one embodiment, processing of the data by the apparatus from the determined tap point may occur. In various embodiments, either the ingress device 102, the egress device 104, or the intermediate device 110 of FIG. 1 may process the data, as described above. In one embodiment, the plurality of processing stages 406 of FIG. 4 may process the data, as described above.

Block 564 illustrates that, in one embodiment, processing of the data may complete. In various embodiments, either the ingress device 102, the egress device 104, or the intermediate device 110 of FIG. 1 may finish processing the data, as described above. In one embodiment, the plurality of processing stages 406 of FIG. 4 may finish processing the data, as described above.

Block 566 illustrates that, in one embodiment, the data may be transmitted to an egress device. In various embodiments, either the ingress device 102 or the intermediate device 110 of FIG. 1 may transmit the data, as described above. In one embodiment, the egress port 404 of FIG. 4 may transmit the data, as described above.

In one embodiment, Block 566 may include the egress device transmitting the data from the system. In various embodiments, either the egress device 104 of FIG. 1 may transmit the data, as described above. In one embodiment, the egress port 404 of FIG. 4 may transmit the data, as described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   at least one processor; and
   at least one memory device coupled to the at least one processor, the at least one memory device comprising instructions stored thereon that, when executed by the at least one processor, are configured to cause the system to:
   receive first data with an ingress device;
   process, using a first pipeline stage, the received first data and transfer the processed first data to a first tap point;
   determine if a first condition is met at the first tap point;
   transfer, from the first tap point, the processed first data to a first offload device when the first condition is met, otherwise transfer, from the first tap point, the processed first data to a second pipeline stage when the first condition is not met;
   process, using the second pipeline stage, the processed first data received from the first tap point when the first condition is not met, transfer the further processed first data to a second tap point, and transfer the further processed first data, from the second tap point, to a second offload device when a second condition is met, otherwise transmit the further processed first data with an egress device when the second condition is not met;
   process, using the second pipeline stage, second data received from the first offload device when the first condition is met, transfer the processed second data to the second tap point, and transfer the processed second data, from the second tap point, to the second offload device when the second condition is met, otherwise transmit the processed second data with the egress device when the second condition is not met, the second data having been produced by the first offload device by further processing the processed first data; and
   receive third data from the second offload device when the second condition is met and transmit the third data with the egress device, the third data having been produced by the second offload device by processing the further processed first data or the processed second data.

2. The system of claim 1, wherein the first tap point is configured to add a tag to the processed first data, the tag including an external destination field, an external source field, an internal destination field, and an internal source field.

3. The system of claim 1, wherein the first condition is based at least in part on a characteristic of the processed first data.

4. The system of claim 1, wherein the processed first data is transferred to the first offload device via a network switching fabric, the further processed first data is transferred to the second offload device via the network switching fabric, and the processed second data is transmitted to the second offload device via the network switching fabric.

5. The system of claim 1, wherein the instructions, when executed by the at least one processor, are configured to cause the system to:
   transfer the processed first data to the first offload device via an intermediate device, wherein the intermediate device is equivalent to the ingress device coupled with the first offload device.

6. The system of claim 5, wherein the instructions, when executed by the at least one processor, are configured to cause the system to:
   transfer the processed first data to the first offload device via the intermediate device utilizing a system network fabric that comprises interconnects coupled to a plurality of system devices, the plurality of system devices comprising the ingress device, the egress device, the offload device, and the intermediate device.

7. The system of claim 6, comprising:
   a first sub-system comprising the ingress device and the egress device; and
   a second sub-system comprising the intermediate device and the first offload device, wherein the first sub-system and second sub-system are coupled via the system network fabric.

8. The system of claim 1, wherein the instructions, when executed by the at least one processor, are configured to cause the system to:

associate a tag with the processed first data, the tag having a processing description portion and a fabric forwarding information portion, place an external source field and an external destination field in the processing description portion, and place an internal source field and an internal destination field in the fabric forwarding information portion.

9. An apparatus comprising:

a plurality of hardware components configured to implement a plurality of processing stages, at least some of the plurality of processing stages including a tap point at which the apparatus may transfer data being processed to another apparatus for an intermediate processing stage that is not implemented by the plurality of hardware components;

at least one processor; and at least one memory device coupled to the at least one processor, the at least one memory device comprising instructions stored thereon that, when executed by the at least one processor, are configured to cause the apparatus to:

receive first data at an ingress port;

process the first data by at least a first processing stage of the plurality of processing stages;

transfer, upon reaching the tap point of one of the plurality of processing stages, the processed first data to the another apparatus for the intermediate processing stage;

receive, from the another apparatus, second data, the second data having been produced by the another apparatus by performing the intermediate processing stage on the processed first data;

process the second data by at least a second processing stage of the plurality of processing stages; and transmit the processed second data from an egress port.

10. The apparatus of claim 9, wherein the instructions, when executed by the at least one processor, are configured to cause the apparatus to:

select the at least some of the plurality of processing stages that include the tap point.

11. The apparatus of claim 9, wherein the instructions, when executed by the at least one processor, are configured to cause the apparatus to associate, with a tag editor, a tag with the first data, the tag comprising:

an external destination field which denotes an external destination for the first data external to a system of which the apparatus is part of, an external source field which denotes an external source for the first data external to the system, an internal destination field which denotes an internal destination for the first data internal to the system, and an internal source field which denotes an internal source for the first data internal to the system of which the apparatus is part of.

12. The apparatus of claim 9, wherein:

the apparatus is internal to a system for routing data, the system configured to interact with devices external to the system and devices internal to the system; and wherein the instructions, when executed by the at least one processor, are configured to cause the apparatus to:

associate, with a tag editor, a tag with the first data, the tag having a processing description portion and a fabric forwarding information portion, place, with the tag editor, an external source field and an external destination field in the processing description portion, and place an internal source field and an internal destination field in the fabric forwarding information portion.

13. The apparatus of claim 9, wherein the instructions, when executed by the at least one processor, are further configured to cause the apparatus to:

suspend, with an offload manager, the processing of the first data by the at one first processing stage of the plurality of processing stages when a selected tap point has been reached; and transmit, with the offload manager the processed first data to the another apparatus, wherein the apparatus is not configured to provide the intermediate processing performed by the another apparatus.

14. The apparatus of claim 13, wherein the instructions, when executed by the at least one processor, are configured to cause the apparatus to associate, with a tag editor, a tag with the first data, wherein the tag comprises:

an internal source field which denotes a source for the first data internal to a system of which the apparatus is a part, and an internal destination field which denotes a destination for the first data internal to the system; and wherein the offload manager is configured to:

edit the tag associated with the first data to denote that the apparatus is the internal source, edit the tag associated with the first data to denote that the another apparatus is the internal destination, and edit the tag to indicate whether or not the first data may return to the apparatus.

15. The apparatus of claim 9, wherein the instructions, when executed by the at least one processor, are further configured to cause the apparatus to:

receive, with an offload manager, the second data from the another apparatus;

read, with the offload manager, a tag associated with the second data that indicates an amount of processing that has been performed on the second data by the another apparatus;

based at least in part upon the amount of processing indicated by the tag, determine, with the offload manager, an appropriate tap point at which to resume processing; and resume, with the offload manager, processing of the second data by the at least the second processing stage of the plurality of processing stages at the determined appropriate tap point.

16. A method of using an apparatus that is internal to a system comprising:

receiving first data with an ingress port;

processing the first data utilizing a first portion of a plurality of stages, wherein the first portion of the plurality of stages comprises at least one active tap point;

reaching the at least one active tap point during processing of the first data by the first portion of the plurality of stages;

suspending processing of the first data by the first portion of the plurality of stages when the active tap point is reached;

after suspension of the processing, editing a tag associated with at least some of the processed first data, and transmitting the tag and the processed first data to an offload engine device;

receiving second data from the offload engine device, the second data having been produced by the offload engine device by further processing the processed first data;

processing of the second data by a second portion of the plurality of stages; and transmitting the processed second data from an egress port.

17. The method of claim 16, wherein the apparatus is not configured to provide the further processing that is performed by the offload engine device, and resuming processing of the second data by the second portion of the plurality of stages further comprises:
- determining another active tap point of the second portion of the plurality of stages from which to begin processing the second data; and
- processing of the second data, by the apparatus, at the determined another active tap point.

18. The method of claim 16, further comprising:
- editing the tag associated with the at least some of the processed first data such that the tag comprises:
  - a fabric forwarding information portion having:
    - a source field which denotes a source for the processed first data,
    - a destination field which denotes a destination for the processed first data; and
  - a processing description portion having information to facilitate the processing of the processed first data by the offload engine device.

19. The method of claim 18, wherein editing the tag associated with the at least some of the processed first data comprises:
- determining whether or not the source and destination fields refer to an external source and an external destination that are external to the system;
- if so, copying the source field and the destination field from the fabric forwarding information portion to the processing description portion;
- editing the source field of the fabric forwarding information portion to refer to the apparatus; and
- editing the destination field of the fabric forwarding information portion to refer to the offload engine device.

20. The method of claim 16, wherein transmitting the tag and the processed first data to the offload engine device comprises:
- transmitting the tag and the processed first data to an intermediate device via a network switching fabric; and
- providing instructions to the intermediate device to transmit the processed first data to the offload engine device.

21. The method of claim 20, wherein receiving the second data from the offload engine device comprises:
- receiving the second data from the offload engine device via the intermediate device.

* * * * *